United States Patent [19]
Newdigate

[11] 3,712,703
[45] Jan. 23, 1973

[54] REAR VIEW MIRROR WITH AIR VANE ROTATION MEANS

[75] Inventor: Charles Barrington Newdigate, Cape Town, South Africa

[73] Assignee: Ivan Henry Cathcart-James, Cape Town, South Africa

[22] Filed: Jan. 25, 1971

[21] Appl. No.: 109,488

[30] Foreign Application Priority Data

Feb. 13, 1970  South Africa ........................ 70/0990

[52] U.S. Cl. .................................... 350/62, 350/289
[51] Int. Cl. .......................... G02b 5/08, B60r 1/06
[58] Field of Search .................... 350/61, 62, 63, 289

[56] References Cited

UNITED STATES PATENTS 3,021,757   2/1962   Ellis, Jr. .................................. 350/62
2,737,852   3/1956   Porter et al. ............................ 350/62

FOREIGN PATENTS OR APPLICATIONS 1,035,499   7/1958   Germany .............................. 350/63
1,002,589   8/1965   Great Britain ....................... 350/62

Primary Examiner—David H. Rubin
Attorney—Larson, Taylor and Hinds

[57] ABSTRACT

The invention provides a reflector device having a mirror, a support frame, mounting means for mounting the mirror on the support frame for rotation about an axis perpendicular to the mirror's reflecting surface, a plurality of radially extending vanes attached to the mirror's periphery to cause the mirror to rotate when air passes through the vanes, and air guide means for guiding air towards the vanes.

2 Claims, 3 Drawing Figures

REAR VIEW MIRROR WITH AIR VANE ROTATION MEANS

The present invention relates to reflector devices, more particularly rear view mirrors for road vehicles.

Often, in particular in rainy or misty conditions, droplets of moisture or other undesired foreign particles collect on the external rear view mirror of a road vehicle. These droplets either fully obscure the reflecting surface of such a mirror, or they distort the reflected image so that the mirror's utility is decreased considerably, and in some cases it even is of no use.

Various methods have been suggested to overcome this problem. Several previous attempts of using a rotatable mirror, for throwing off collected droplets by centrifugal force, are known to the applicant. However, none of these prior arrangements appear to have provided an arrangement in a simple manner, which arrangement is also effective at relatively low vehicle speeds.

It is an object of the invention to provide a rear view mirror which will overcome the disadvantages of prior arrangements in a simple manner.

According to the invention, a reflector device for mounting on a road vehicle includes a mirror; a support frame; mounting means for mounting the mirror on the support frame for rotation about an axis perpendicular to the mirror's reflecting surface; a plurality of radially extending vanes attached to the mirror's periphery to cause the mirror to rotate when air passes through the vanes; and air guide means attached to and rotatable with the vanes for guiding air towards the vanes, the air guide means being adapted to accelerate air flowing towards the vanes.

The air guide means may include a tubular member having an air inlet opening and an air outlet opening, the outlet opening being at the vanes, and the inlet opening having an area considerably larger than the outlet opening.

The support frame may be in the form of a housing enclosing the mounting means for rotatably mounting the mirror.

The housing may be of aerodynamic shape for assisting to accelerate air flow towards the air guide means.

The device may also include an electrical motor for driving the mirror at low air speeds. The motor may be housed in the housing.

Further according to the invention, a reflector device includes a rotatable mirror, a housing having a rear end and an open front end and adapted to be mounted on a road vehicle, a support plate rigidly mounted in the housing between the front and rear ends to locate firmly a bearing in which a shaft is rotatably mounted to extend on either side out of the bearing, an electrical motor mounted in the housing between the support plate and the rear end by attachment only to the rotatable shaft on its end extending through the bearing to the rear end, and a mounting member for rotatably mounting the mirror on the shaft on its end extending to the front end so that its reflecting surface is visible through the open end.

The invention will now be described by way of example with reference to the accompanying schematic drawings.

IN THE DRAWINGS

Figure 1:
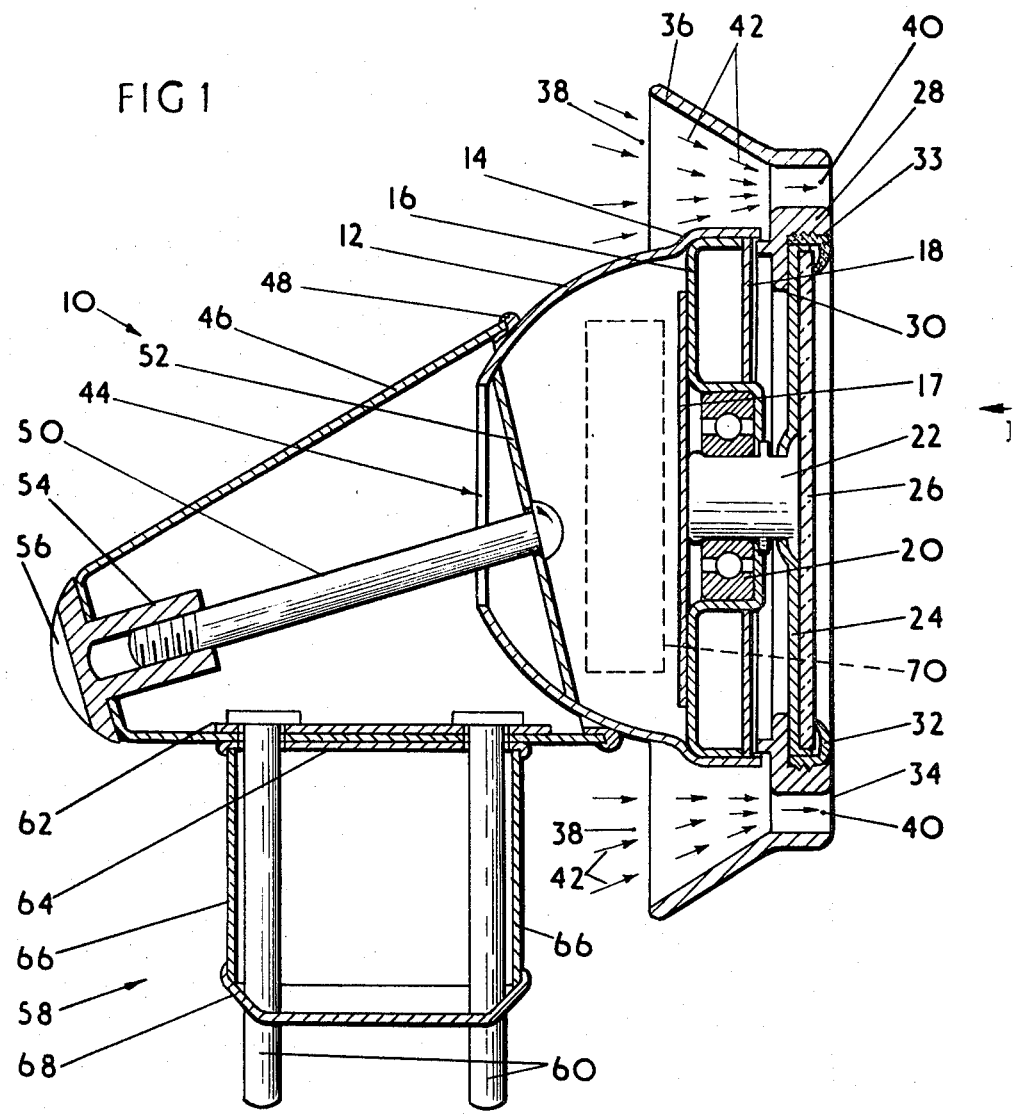
FIG. 1 shows a sectional side view of a reflector device in accordance with the invention including a vane driving arrangement.
Figure 2:
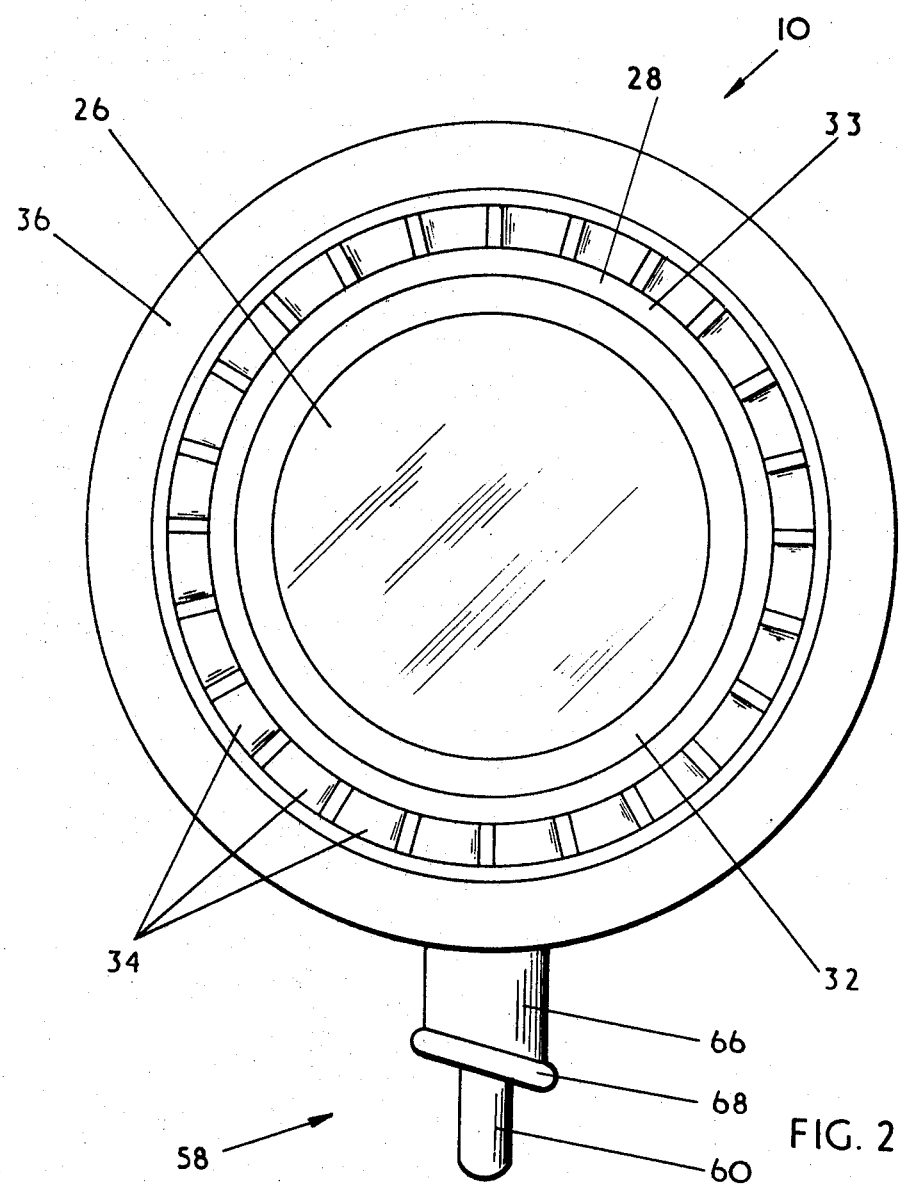
FIG. 2 shows a front view seen along arrow II in FIG. 1.

Referring to FIGS. 1 and 2, the reflector device 10 includes a dome-shaped housing 12 having an open shoulder front end 14 in which a support plate 16 is fitted. The plate 16 is reinforced by disc plates 17 and 18 and centrally carries a ball bearing 20. A rotatable shaft 22 is mounted on the inside of the bearing 20 and at its front end a mirror mounting plate 24 is firmly attached to it. The circular reflecting mirror 26 is placed on the plate 24 so that its reflecting surface faces outwardly. The plate 24 also carries a vane member 28, which has a collar 30 abutting rearwardly against the plate 24. On the front of the vane member 28 a toothed locking ring 32 locks into a correspondingly toothed annular ring part 33 of the vane member 28 for holding the mirror 26 firmly in position.

The vane member 28 is provided with a number of radially extending vanes 34. On its outside it carries an air guide channel 36. It is clear from the drawing that the inlet area at 38 of the channel is considerably larger than the outlet area at 40. Air flowing in the direction indicated by arrows 42 therefore is accelerated — the channel 36 thus provides a "venturi" effect. Depending on the design, this can be made such that the mirror will rotate sufficiently even at low vehicle speeds.

The housing 12 has a central rearward hold 44 for mounting purposes. A rear mounting cup 46 fits via a sealing ring 48 on to the housing 12. A tension bolt 50 passes from a tension plate 52 to a locking nut 54. The nut 54 has a slot 56 for operation by a screwdriver or the like. In use, the housing 12 is adjusted to a correct position, and then the nut 54 is tightened for locking the housing 12 in this position.

The cup 46 is mounted on a road vehicle body by means of the stud arrangement 58, which includes two studs 60, a reinforcing plate 62, a grummet 64, a bracket 66 and a close-off member 68. The studs 60 are threaded for attachment to the vehicle body (not shown).

Due to the provision of the guide channel 36, the mirror 26 should be rotated sufficiently at low vehicle speeds, so as to throw off moisture droplets and the like. However, in order to assist rotation, an electrical motor 70, fitted inside the housing 12, may also be provided. Thereby, at low vehicle speeds, the driver of a road vehicle may start the motor for rotation of the mirror, and may stop it again when the vehicle speed has increased sufficiently.

Figure 3:
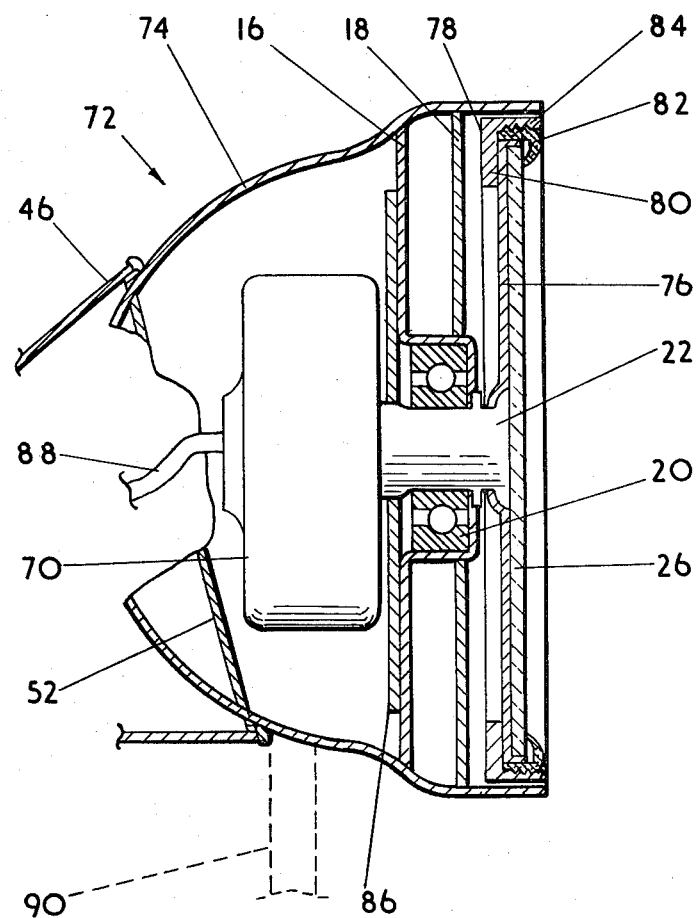
FIG. 3 shows a sectional side view of part of a reflector device in accordance with the invention including a motor driving arrangement.

Referring now to FIG. 3, equal parts have been marked similarly. Here the rear mounting cup 46 (see FIG. 1) is shown only in part.

The reflector device 72 here is provided with a dome-shaped housing 74, which has a slightly different shape as compared to that of housing 12 in FIG. 1. It has a front flat plate 76, which closes off the mirror support member 78 and which is mounted on the shaft 22. The mirror support member 78 has a collar 80 abutting rearwardly against the plate 76. On the front, a toothed ring 82 locks into a correspondingly toothed annular ring part 84 of the support member 78 for holding the mirror 26 firmly in position. The rear plate 86 is provided with a hole for the shaft 22 to extend through to the electrical motor 70.

This device therefore is operated only by means of the motor 70. The driver of the vehicle merely has to switch on a circuit (not shown) to supply current through the wires 88 to the motor 70 when required for cleaning the mirror 26.

Instead of the rear cup mounting, in particular in the case of trucks, the housing 74 can be mounted directly to the truck body by means of an arm 90.

I claim:

1. A reflector device for mounting on a road vehicle, which includes a mirror; a support frame; mounting means for mounting the mirror on the support frame for rotation about an axis perpendicular to the mirror's reflecting surface; a plurality of radially extending vanes attached to the mirror's periphery to cause the mirror to rotate when air passes through the vanes; and air guide means, attached to and rotatable with the vanes, for guiding air towards the vanes and for accelerating the air flowing towards the vanes, said air guide means including a tapered tubular member encircling the vanes and providing an air inlet opening and an air outlet opening, the outlet opening being at the vanes, and the inlet opening having an area considerably larger than the outlet opening, said support being in the form of a housing of aerodynamic shape for assisting in acceleration of air flow toward said air guide means.

2. A reflector device as claimed in claim 1, which includes an electrical motor for driving the mirror at low air speeds.

* * * * *